US012593155B2

(12) United States Patent
Jin et al.

(10) Patent No.: US 12,593,155 B2
(45) Date of Patent: Mar. 31, 2026

(54) SPEAKER BOX

(71) Applicant: AAC Microtech (Changzhou) Co., Ltd., Changzhou (CN)

(72) Inventors: Xin Jin, Changzhou (CN); Wei Song, Changzhou (CN); Yun Tang, Changzhou (CN); Jie Ma, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 151 days.

(21) Appl. No.: 18/744,688

(22) Filed: Jun. 16, 2024

(65) Prior Publication Data

US 2025/0330734 A1 Oct. 23, 2025

Related U.S. Application Data

(63) Continuation of application No. PCT/CN2024/089149, filed on Apr. 22, 2024.

(51) Int. Cl.

*H04R 1/02* (2006.01)
*H04R 9/02* (2006.01)
*H04R 9/06* (2006.01)

(52) U.S. Cl.

CPC .............. *H04R 1/025* (2013.01); *H04R 1/023* (2013.01); *H04R 9/025* (2013.01); *H04R 9/06* (2013.01); *H04R 2201/029* (2013.01); *H04R 2400/11* (2013.01)

(58) Field of Classification Search

CPC .......... H04R 9/06; H04R 1/025; H04R 9/025; H04R 2499/11; H04R 1/023; H04R 2400/11

See application file for complete search history.

(56) References Cited

U.S. PATENT DOCUMENTS

2020/0314548 A1* 10/2020 Hu .......................... H04R 9/025
2021/0067877 A1* 3/2021 Jeon .......................... H04S 1/007

* cited by examiner

*Primary Examiner* — Kile O Blair

(74) *Attorney, Agent, or Firm* — Wiersch Law Group

(57) ABSTRACT

The present disclosure discloses a speaker box including: a housing and a speaker, including: a frame; a vibration system, including: a diaphragm; and a coil; a magnet system, including: a main yoke; a main magnet; and an elastic support member, including: a bottom wall surrounding the main yoke; and a side wall; a metal mesh cover surrounding the elastic support member and fixedly connected to the frame; an inner chamber is enclosed by the frame, the main yoke, the elastic support member and the diaphragm; a back chamber isolated from the inner chamber is enclosed by the main yoke, the elastic support member, the metal mesh cover and the housing; a plurality of air vents provided on the metal mesh cover is configured to connect the back chamber with the inner chamber. The speaker box in the present disclosure has higher reliability and higher sound quality.

10 Claims, 8 Drawing Sheets

SPEAKER BOX

FIELD OF THE PRESENT DISCLOSURE

The present disclosure relates to electric-acoustic conversion technologies, especially relates to a speaker box.

DESCRIPTION OF RELATED ART

With the development of wireless communication, user has increasing demands for mobile electronic devices having multifunctional development. A speaker box having high sound quality served as sound play device is wildly in mobile electronic devices.

In related art, the speaker box generally includes a plurality of components stacked on each other. However, the stacked structure not only reduces its seal ability and vibration space of the vibration system, but also increases its height, thus negatively influencing the acoustic performance and the reliability of the speaker box.

Therefore, it is necessary to provide an improved speaker box to overcome the problems mentioned above.

SUMMARY OF THE INVENTION

One object of the present disclosure is to provide a speaker box with higher reliability and higher sound quality.

A speaker box including: a housing having a receiving space; and a speaker received in the receiving space, comprising: a frame; a vibration system fixed to the frame, including: a diaphragm fixed to the frame; and a coil fixed to the diaphragm and inserted into the magnetic gap; a magnet system having a magnetic gap and configured to drive the vibration system to vibrate, including: a main yoke spaced apart from the frame; a main magnet mounted on a side of the main yoke facing the coil; and an elastic support member configured to connect the main yoke with the frame, including: a bottom wall surrounding the main yoke; and a side wall bended and extended from an edge of the bottom wall; a metal mesh cover surrounding the elastic support member and fixedly connected to the frame; wherein the side wall is fixed to the metal mesh cover; an inner chamber is enclosed by the frame, the main yoke, the elastic support member and the diaphragm; a back chamber is enclosed by the main yoke, the elastic support member, the metal mesh cover and the housing; the back chamber is isolated from the inner chamber; a plurality of air vents provided on the metal mesh cover is configured to connect the back chamber with the inner chamber.

As an improvement, the metal mesh cover includes an annular main body, and a plat portion bended and extended from an end of the main body away from the frame along a vibration direction; the main body surrounds the elastic support member; the side wall is fixed to a side of the main body facing the inner chamber; the plat portion is fixed to a surface of the bottom wall away from the main yoke.

As an improvement, the frame is in a rectangular shape; the elastic support member includes two side walls opposite to each other along a direction parallel with a short axis; the side wall extends along a direction parallel with a long axis.

As an improvement, the metal mesh cover includes two plat portions opposite to each other along a direction parallel the long axis; the plat portion is fixed to a portion of the bottom wall the located along the short axis.

As an improvement, the main body includes two first connection segments, and two second connection segments opposite to each other along a direction parallel with the long axis; the first connection segment is connected to the second connection segment; the first connection segment is fixedly connected to the side wall; the plurality of air vents is provided on the second connection segment; the plat portion is bended from the second connection segment.

As an improvement, a first slot is formed by denting from a surface of the first connection segment facing the frame along a direction away from the frame; a first protrusion protruding towards the main magnet is provided on the side wall to match the first slot.

As an improvement, a second slot is formed by denting from a surface of the first connection segment away from the frame towards the frame; a second protrusion protruding away from the main magnet is provided on the side wall to match the second slot.

As an improvement, the elastic support member further includes a location bar connected with the bottom wall and spaced and parallel to the side wall; the main yoke includes a side surface abutted against to the bottom wall; a location slot is formed on the main yoke by denting from the side surface along a direction away from the side wall; the location bar is fixedly connected to the main yoke by matching with the location slot.

As an improvement, the magnet system further includes a second magnet spaced apart from the main magnet to form the magnetic gap, and an annular second yoke disposed on a side of the second magnet away from the main yoke; the second yoke includes a fixation protrusion protruding from an outer edge thereon towards the side wall; the fixation protrusion is abutted to a side of the first protrusion facing the second magnet.

As an improvement, the housing includes a first cover and a second cover fixed to each other; an installation hole is provided on the second cover to install the speaker, thus exposing the metal mesh cover and the main yoke outside the installation hole

BRIEF DESCRIPTION OF THE DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENTS

In order to make the inventive objectives, features, and advantages of the present disclosure more understandable, the technical solutions in embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

Figure 1:
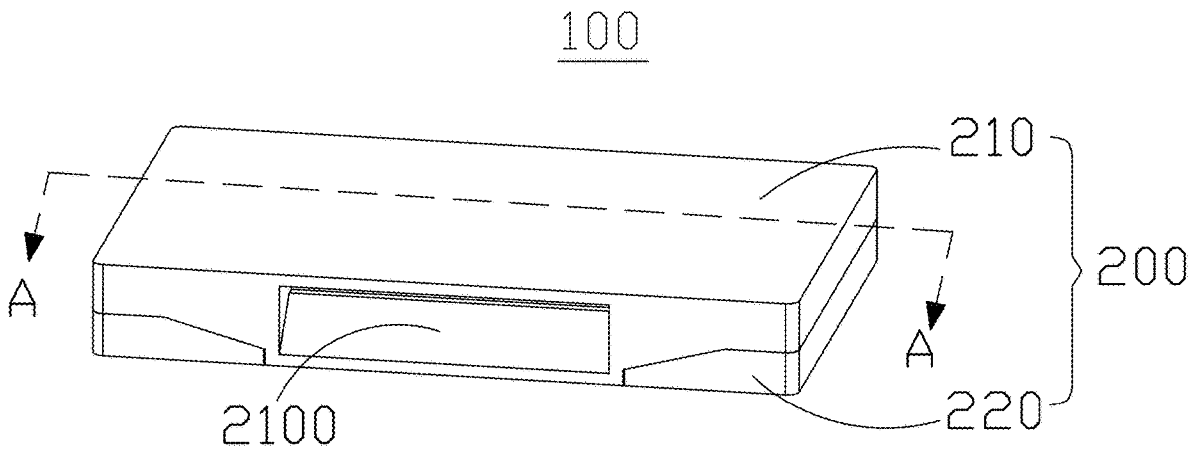
FIG. 1 is an isometric view of a speaker box in accordance with an exemplary embodiment of the present disclosure.
Figure 2:
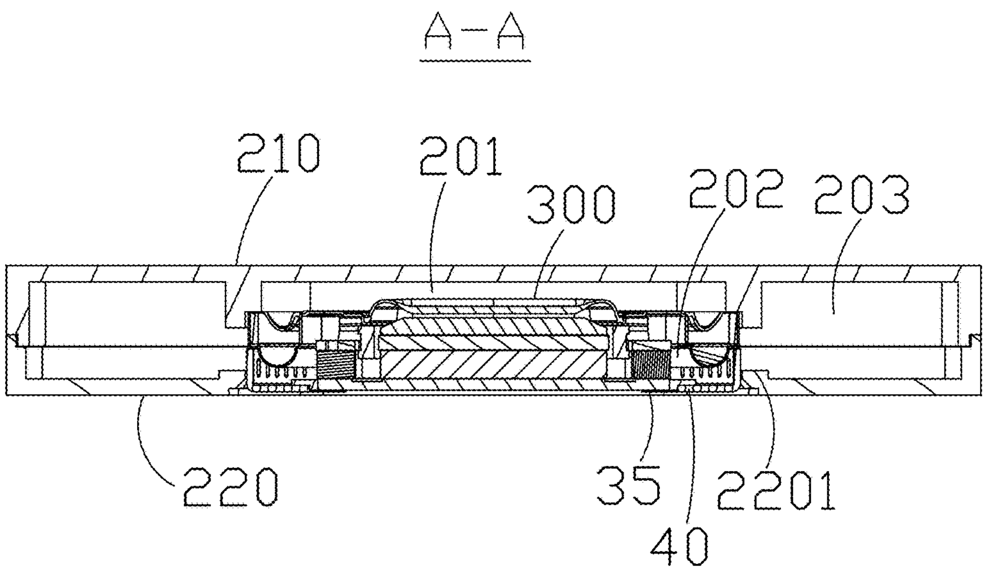
FIG. 2 is a section view of the speaker box taken along line A-A in FIG. 1.
Figure 3:
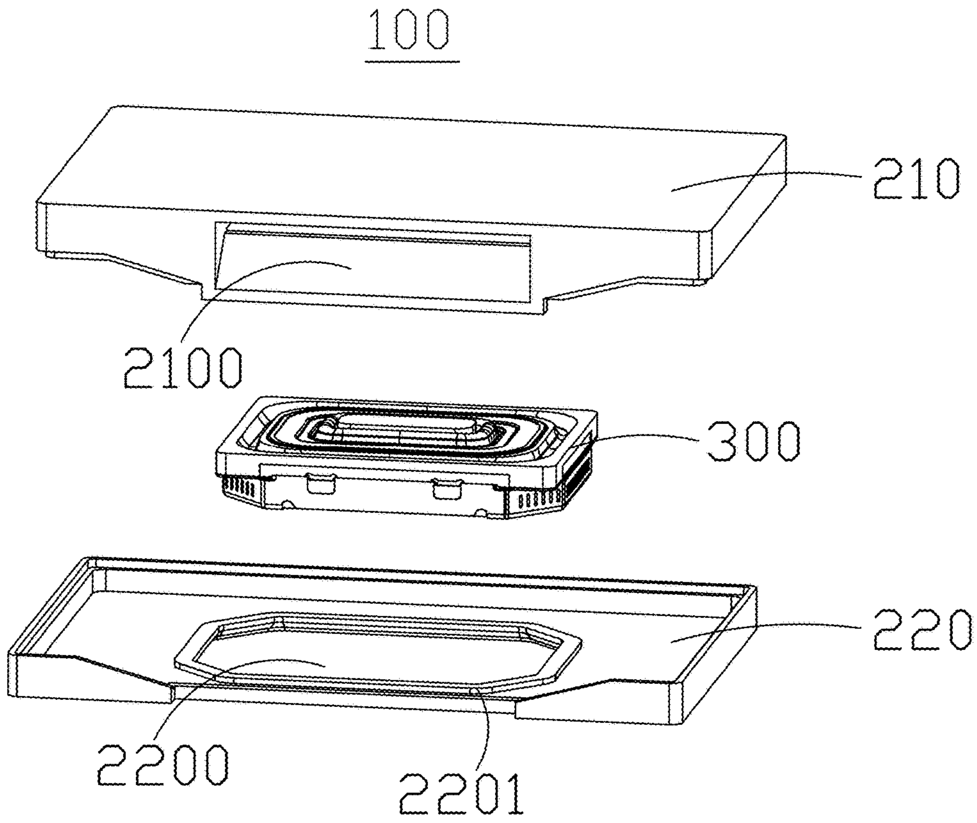
FIG. 3 is an exploded view of the speaker box in FIG. 1.

Please refer to FIGS. 1-3, a speaker box 100 provided by an exemplary embodiment of the present disclosure includes a housing 200 having a receiving space 201 and a speaker 300 received in the housing 200.

Specifically, the housing 200 includes a first cover 210 and a second cover 220 fixed to each other. The receiving space 201 is enclosed by the first cover 210 and the second cover 220. A sound outlet 2100 is provided on the first cover 210 to connecting the receiving space 201 and outside. The sound wave generated by the speaker 300 is transmitted to outside through the sound outlet 2100.

As shown in FIG. 3, the second cover 200 includes an installation protrusion 2201 protruding towards the first cover 210. An installation hole 2200 penetrating the second cover 220 is enclosed by the installation protrusion 2201. The speaker 300 is mounted on the installation protrusion 2201 and covers the installation hole 2200.

As shown in FIGS. 4-7, the speaker 300 includes a frame 10, a vibration system 20 fixed to the frame 10, a magnet system 30 having a magnetic gap 36 and configured to drive the vibration system 20 to vibrate, and a metal mesh cover 40 surrounding the magnet system 30.

Figure 5:
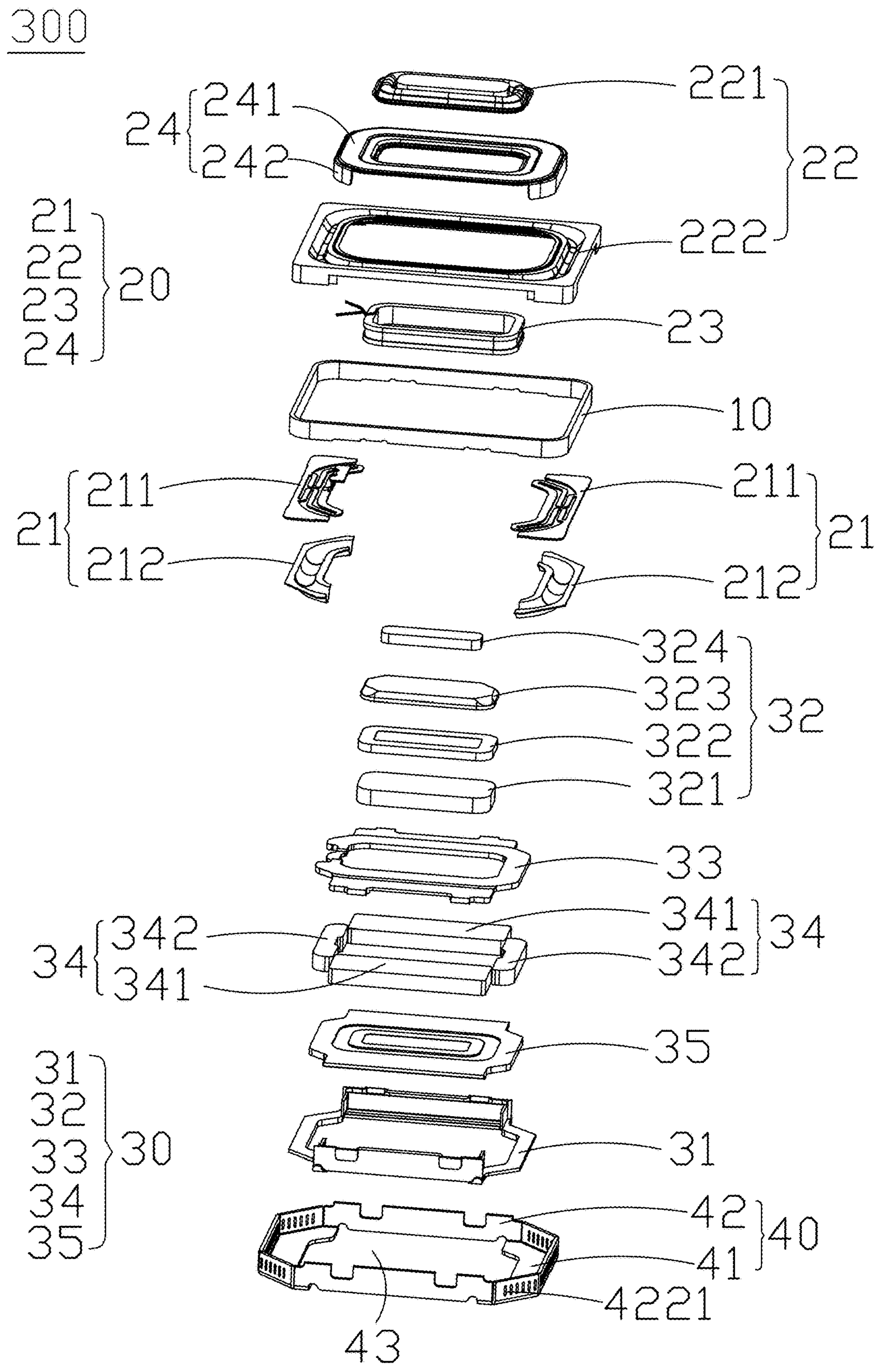
FIG. 5 is an exploded view of the speaker in FIG. 4.
Figure 6:
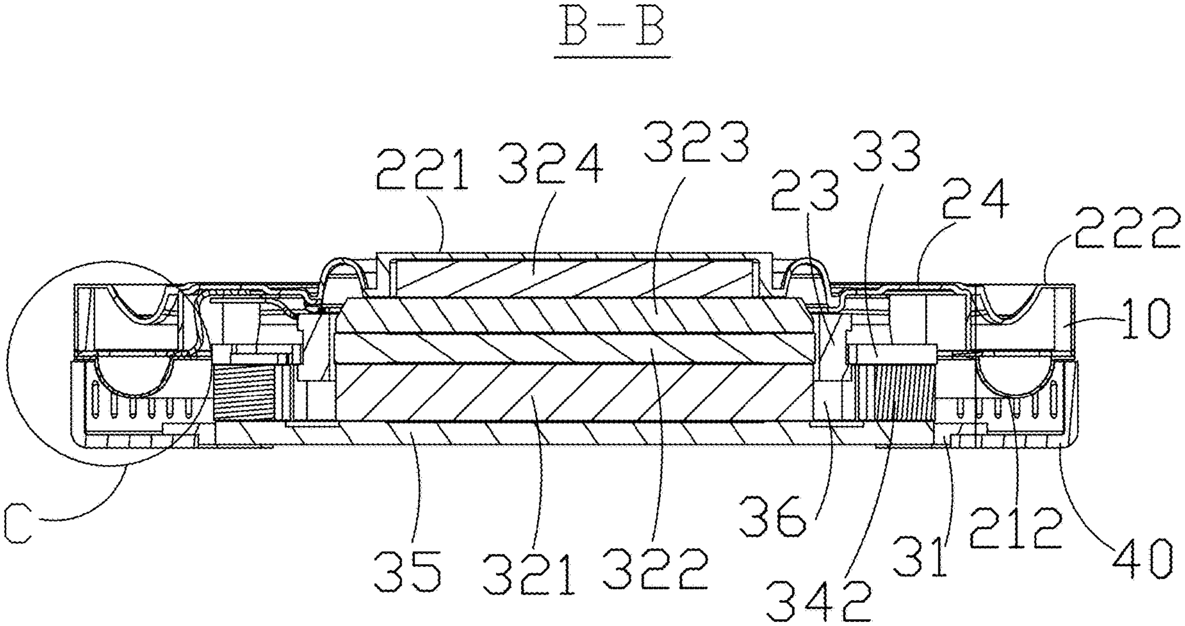
FIG. 6 is a section view of the speaker taken along line B-B in FIG. 4.
Figure 7:
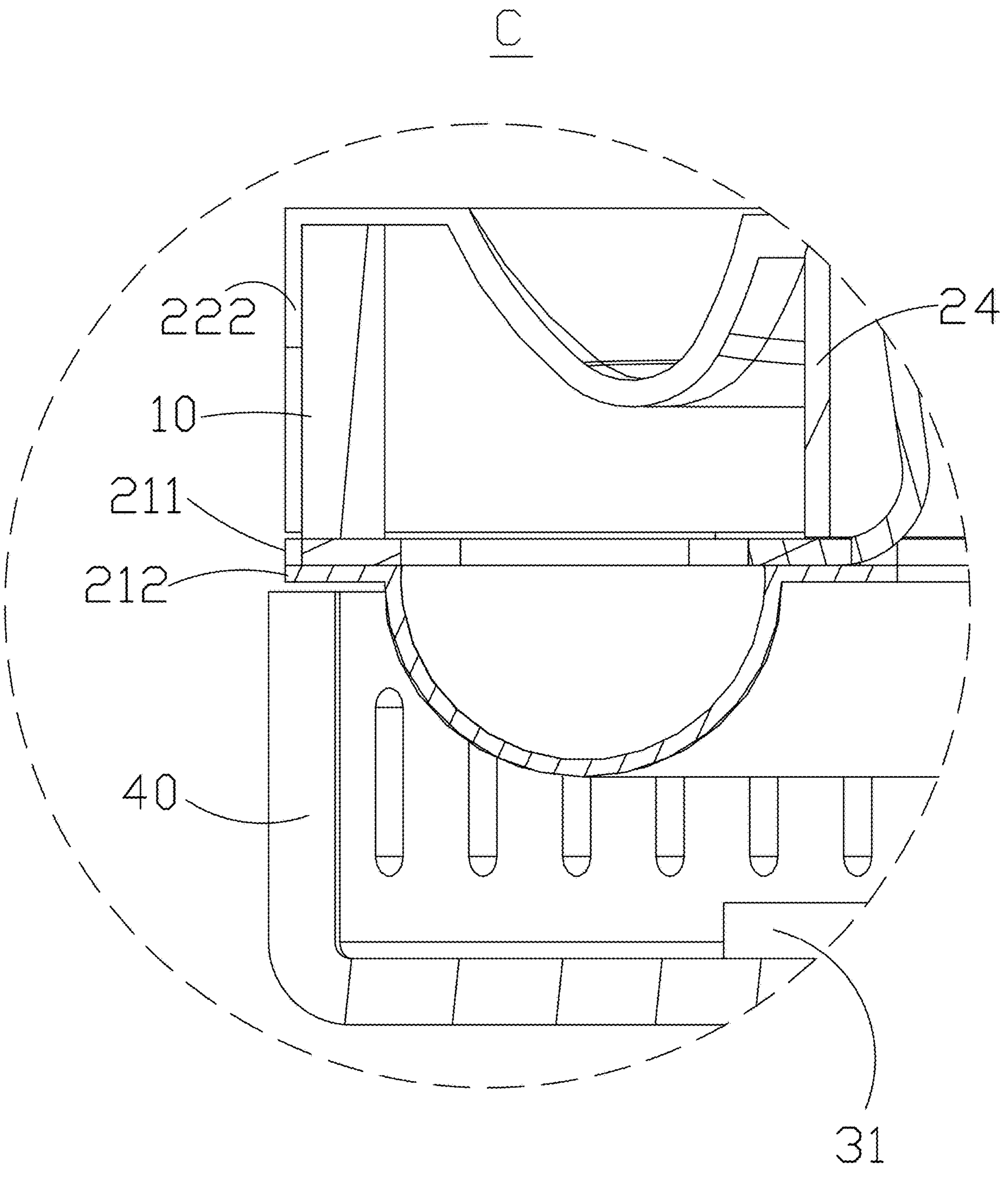
FIG. 7 is an enlarged view of partial section C in FIG. 6.

As shown in FIGS. 5-7, the vibration system 20 includes a diaphragm 22 fixed to the frame 10, a skeleton 24 fixed to a side of the diaphragm 22 facing the magnet system 30, and a coil 23 inserted into the magnetic gap 36 through the skeleton 24. When the coil is powered on, the coil 23 is driven by the magnet system 30, thereby driving the diaphragm 22 to vibrate to generate sound wave.

Specifically, as shown in FIG. 5, the skeleton 24 is annular. The skeleton 24 includes a first connection portion 241 connected to the diaphragm 22, and a second connection portion 242 bended from an edge of the first connection portion 241 and extended towards the magnet system 30. As shown in FIGS. 5-7, the diaphragm 22 includes a first membrane 221 connected to an inner edge of the first connection portion 241, and a second membrane 222 connected to an outer edge of the first connection portion 241. The second membrane 222 is mounted on the frame 10. Furthermore, the second membrane 222 is annular having an inner edge fixed to the skeleton 24 and an outer edge fixed to the frame 10. The first membrane 221 and the second membrane 222 have a same protrusion direction towards the metal mesh cover 40.

As shown in FIGS. 5-7, the vibration system 20 further includes an elastic portion 21 having a FPC 211 electrical connected to the coil 23 and a buffer membrane 212 having a same protrusion direction with the second membrane 222. The FPC 211 is fixed to the frame 10 and the second connection portion 242 of the skeleton 24. Specifically, the frame 10 is rectangular. The number of the elastic portion 21 is two. The two elastic portions 21 fixed to the frame 10 separately are spaced apart from each other along a direction parallel with a long axis of the frame 10. The elastic portions 21 are configured to limit the sway of the coil 23 along a direction parallel with a long axis of the frame 10, and further provide buffer for the vibration of the skeleton 24, thereby improving the sound quality of the speaker 300.

Please refer to FIGS. 4-7, the magnet system 30 includes an elastic support member 31 detachably connected to the metal mesh cover 40, a main yoke 35 connected to the elastic support member 31, a main magnet 32, a second magnet 24, and a second yoke 33. The main magnet 32, the second magnet 24, and the second yoke 33 are all mounted on a side of the main yoke 35 away from the elastic support member 31. The second magnet 34 and the main magnet 32 are arranged at an interval for forming the magnetic gap 36. The metal mesh cover 40 is connected to the elastic support member 31 and fixed to the frame 10, thus supporting the magnet system 30 on the frame 10.

Please refer to FIG. 2, an outer edge of the metal mesh cover 40 is mounted on the installation protrusion 2201 to expose the metal mesh cover 40 and the main yoke 35 outside the installation hole 2200 to serve as a part of the housing 200 of the speaker box 100.

Please refer to FIGS. 5-6, the main magnet 32 includes a first main magnetic body 321, a pole plate 322 fixed to a side of the first main magnetic body 321 away from the main yoke 35, a second main magnetic body 323 fixed to a side of the pole plate 322 away from the first magnetic body 321, a third main magnetic body 324 fixed to a side of the second main magnetic body 323 away from the pole plate 322. It should be noted that the second main magnetic body 323 and the third main magnetic body 324 can be integrated molded to one single magnet.

Besides, the second magnet 34 includes two first side magnetic bodies 341 symmetrically and spaced arranged, and two second side magnetic bodies 342 symmetrically and spaced arranged. The first side magnetic bodies 341 are arranged along a direction parallel to a short axis of the frame 10. The second side magnetic bodies 342 are arranged along a direction parallel to a long axis of the frame 10. It should be noted that first main magnetic body 321, the second main magnetic body 323, the third main magnetic body 324, the first side magnetic body 342 and the second side magnetic body 342 are permanent magnet.

Additionally, an inner chamber 202 is enclosed by the frame 10, the main yoke 35, the elastic support member 31 and the diaphragm 22. A back chamber 203 is enclosed by the main yoke 35, the elastic support member 31, the metal mesh cover 40 and the housing 200. The back chamber 203 is isolated from the inner chamber 202. A plurality of air vents 4221 provided on the metal mesh cover 40 is configured to connect the back chamber 203 with the inner chamber 202. Generally, the back chamber 203 can be filled with sound-absorbing material. It should be noted that the sound-absorbing material cannot entering the speaker 300 through the air vents 4221.

Figure 4:
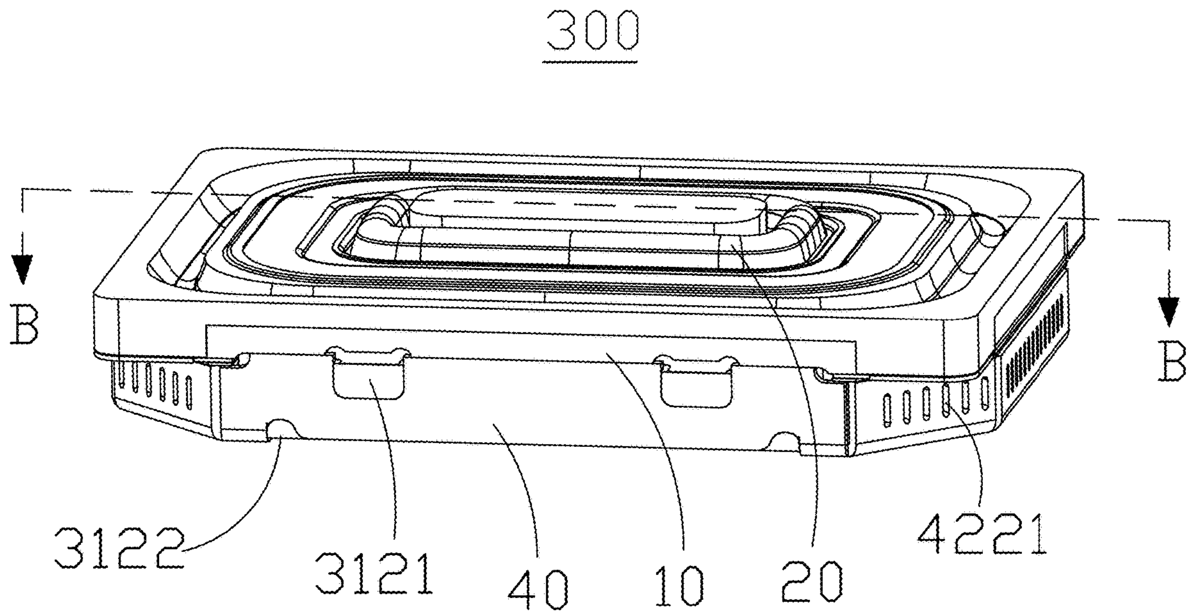
FIG. 4 is an isometric view of a speaker of the speaker box in FIG. 1.
Figure 9:
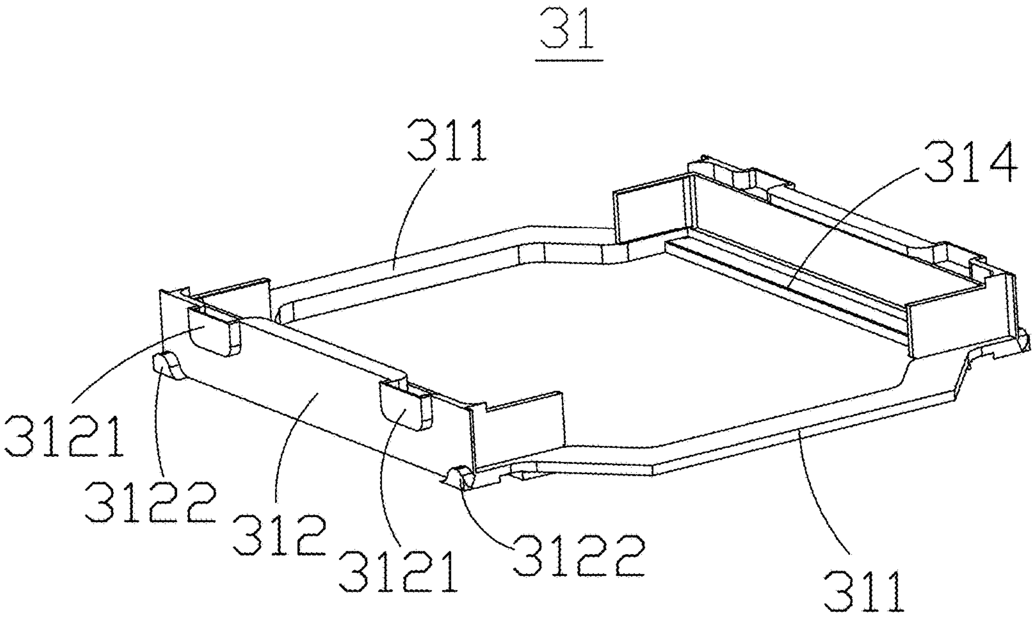
FIG. 9 is an isometric view of an elastic support member of the speaker box in FIG. 1.
Figure 10:
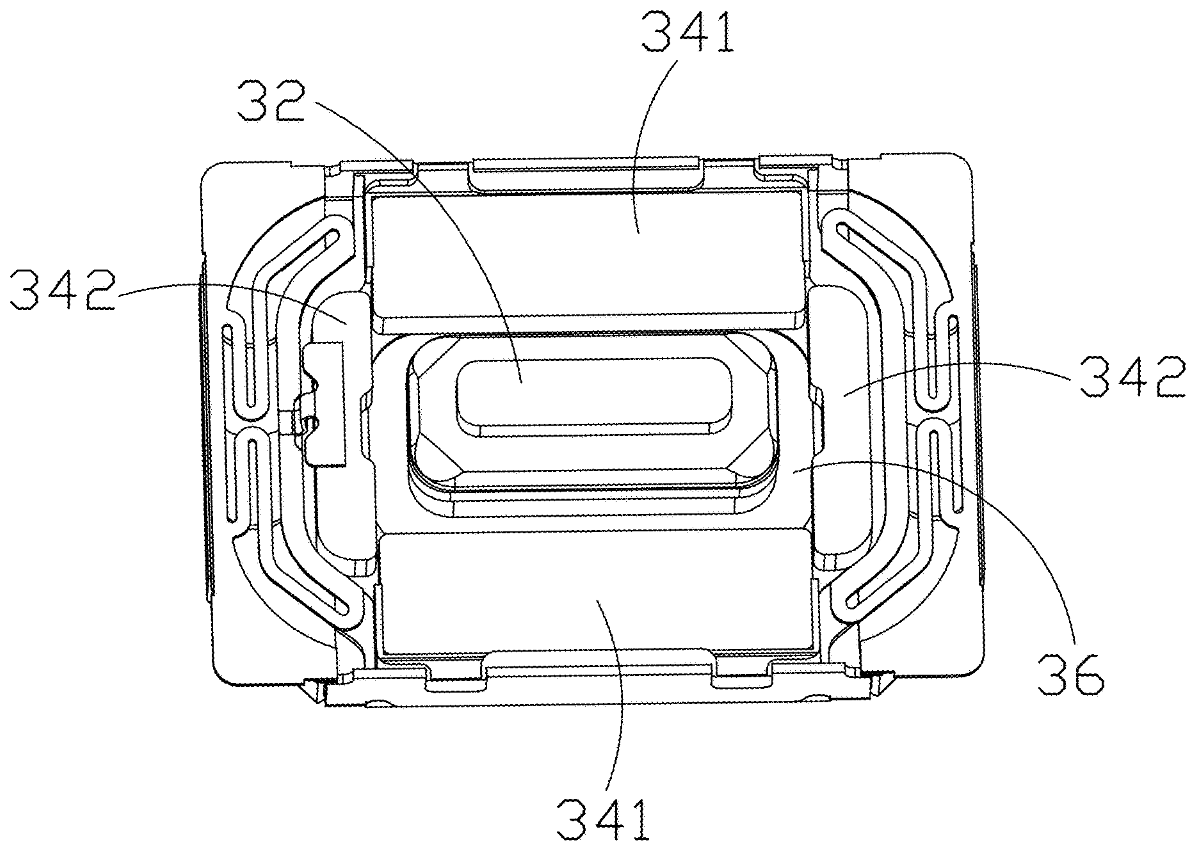
FIG. 10 is an isometric view of an assembly of a main magnet and a second magnet of the speaker box in FIG. 1.
Figure 11:
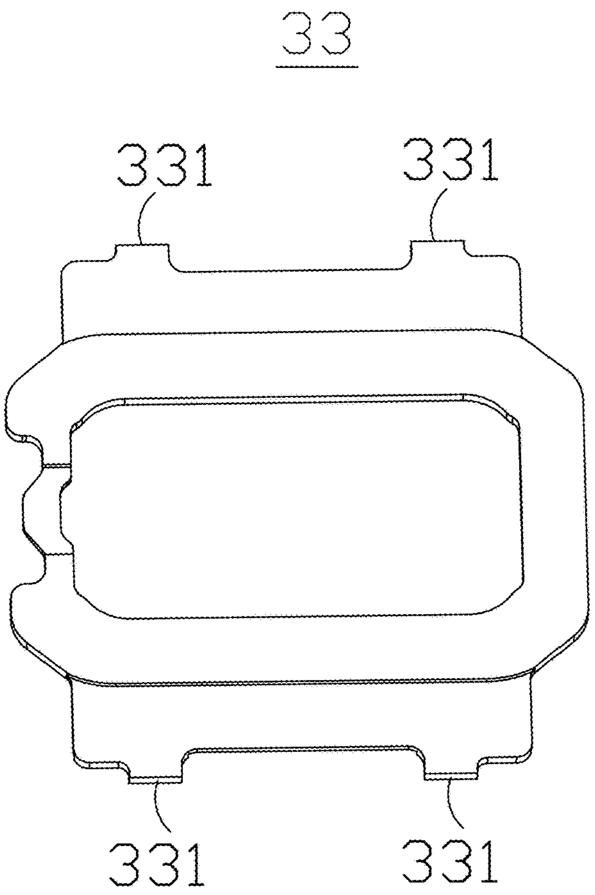
FIG. 11 is an isometric view of a second yoke of the speaker box in FIG. 1.

Please refer to FIG. 4 and FIG. 9, the elastic support member 31 includes a bottom wall 311 surrounding the main yoke 35, and a side wall 312 bended and extended from an edge of the bottom wall 311. Specifically, the elastic support member 31 includes two side walls 312 opposite to each other along a direction parallel with a short axis of the frame 10. The side wall 312 extends along a direction parallel with a long axis of the frame 10. A first protrusion 3121 protruding towards the main magnet 32 and a second protrusion 3122 protruding away from the main magnet 32 are provided on the side wall 312. The first protrusion 3121 and the second protrusion 3122 are connected to the metal mesh cover 40. In one embodiment, the two side walls 312 both includes two spaced first protrusions 3121 and two spaced second protrusions 3122, thereby improving the connection stability between the metal mesh cover 40 and the elastic support member 31.

Besides, the elastic support member 31 further includes a location bar 314 connected with the bottom wall 311 and spaced and parallel to the side wall 312. The location bar 314 is configured to connect to the main magnet 35.

As shown in FIGS. 4-8, the metal mesh cover 40 includes an annular main body 42, and a plat portion 41 bended and extended from an end of the main body 42 away from the frame 10 along a vibration direction. A receiving chamber 43 is enclosed between the plat portion 41 and the main body 42 for receiving the elastic support member 31. The main body 42 surrounds the elastic support member 31 and the magnet system 30. The side wall 312 is fixed to a side of the main body 42 facing the inner chamber 202. The plat portion 41 is fixed to a surface of the bottom wall 311 away from the main yoke 35. To be specific, the metal mesh cover 40 includes two plat portions 41 opposite to each other along a direction parallel the long axis. The plat portion 41 is fixed to a portion of the bottom wall 311 the located along the short axis.

Figure 8:
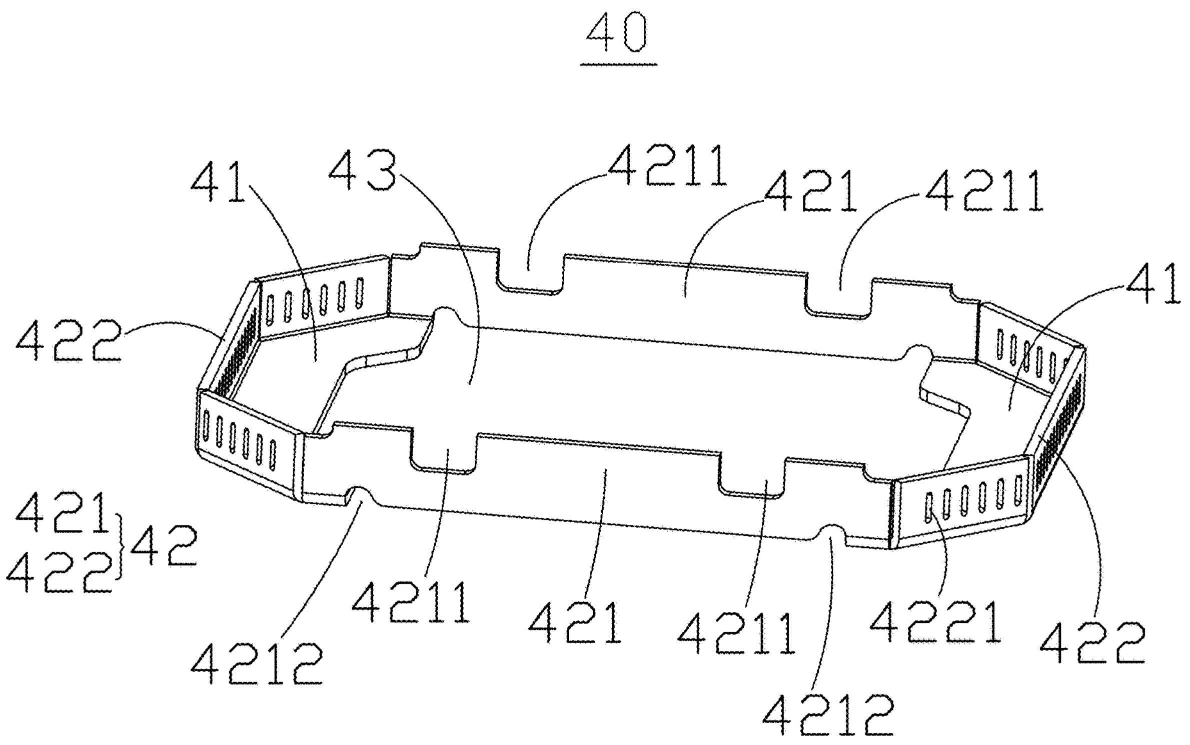
FIG. 8 is an isometric view of a metal mesh cover of the speaker box in FIG. 1.

As shown in FIG. 8, the main body 42 includes two first connection segments 421, and two second connection segments 422 opposite to each other along a direction parallel with the long axis. The first connection segment 421 is connected to the second connection segment 422. The first connection segment 421 is fixedly connected to the side wall 312. The plurality of air vents 4221 is provided on the second connection segment 422. The plat portion 41 is bended from the second connection segment 422. Moreover, a first slot 4211 is formed by denting from a surface of the first connection segment 421 facing the frame 10 along a direction away from the frame 10. A second slot 4212 is formed by denting from a surface of the first connection segment 421 away from the frame 10 towards the frame 10. The first protrusion 3121 matches the first slot 4211. The second protrusion 3122 matches the second slot 4212. Thus, this concave-convex cooperation between the metal mesh cover 40 and the elastic support member 31 can reduce the glue there between, thus decreasing the height of the speaker and increasing the vibration space for the vibration system 20. Besides, the seal ability of the speaker box is also effectively improved.

Figure 12:
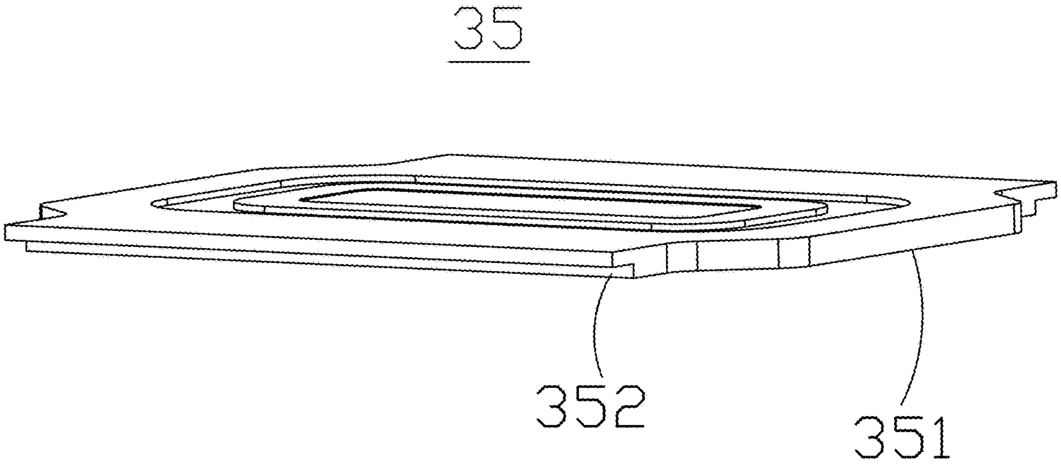
FIG. 12 is an isometric view of a main yoke of the speaker box in FIG. 1.

As shown in FIG. 6 and FIG. 12, the main yoke 35 includes a side surface 351 abutted against to the bottom wall 311. A location slot 352 is formed on the main yoke 35 by denting from the side surface 351 along a direction away from the side wall 311. The location bar 314 is fixedly connected to the main yoke 35 by matching with the location slot 352. The second yoke 33 includes a fixation protrusion 331 protruding from an outer edge thereon towards the side wall 312. The fixation protrusion 331 is abutted to a side of the first protrusion 3121 facing the second magnet 34.

When assembling the second yoke 33, the main yoke 35 and the elastic support member 31, the location bar 314 is clamped into the location slot 352, thus achieving the connection between the main yoke 35 and the bottom wall 311 of the elastic support member 31. The fixation protrusion 331 is abutted to a side of the first protrusion 3121 facing the second magnet 34, thus achieving the connection between the side yoke 33 and the side wall 312 of the elastic support member 31. The main magnet 32 is mounted on a side of the main yoke 35 facing the elastic support member 31. The second magnet 34 is mounted on a side of the second yoke 33 facing the elastic support member 31. The second magnet 34 surrounds the main magnet 32 to form the magnetic gap 36.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box comprising:
- a housing having a receiving space; and
- a speaker received in the receiving space, comprising:
  - a frame;
  - a vibration system fixed to the frame, comprising:
    - a diaphragm fixed to the frame; and
    - a coil fixed to the diaphragm and inserted into the magnetic gap;
  - a magnet system having a magnetic gap and configured to drive the vibration system to vibrate, comprising:
    - a main yoke spaced apart from the frame;
    - a main magnet mounted on a side of the main yoke facing the coil; and
    - an elastic support member configured to connect the main yoke with the frame, comprising:
      - a bottom wall surrounding the main yoke; and
      - a side wall bended and extended from an edge of the bottom wall;
  - a metal mesh cover surrounding the elastic support member and fixedly connected to the frame; wherein
- the side wall is fixed to the metal mesh cover;
- an inner chamber is enclosed by the frame, the main yoke, the elastic support member and the diaphragm;
- a back chamber is enclosed by the main yoke, the elastic support member, the metal mesh cover and the housing; the back chamber is isolated from the inner chamber;
- a plurality of air vents provided on the metal mesh cover is configured to connect the back chamber with the inner chamber.

2. The speaker box as described in claim 1, wherein the metal mesh cover comprises an annular main body, and a plat portion bended and extended from an end of the main body away from the frame along a vibration direction; the main body surrounds the elastic support member; the side wall is fixed to a side of the main body facing the inner chamber; the plat portion is fixed to a surface of the bottom wall away from the main yoke.

3. The speaker box as described in claim 2, wherein the frame is in a rectangular shape; the elastic support member comprises two side walls opposite to each other along a direction parallel with a short axis; the side wall extends along a direction parallel with a long axis.

4. The speaker box as described in claim 3, wherein the metal mesh cover comprises two plat portions opposite to each other along a direction parallel the long axis; the plat portion is fixed to a portion of the bottom wall the located along the short axis.

5. The speaker box as described in claim 4, wherein the main body comprises two first connection segments, and two second connection segments opposite to each other along a direction parallel with the long axis; the first connection segment is connected to the second connection segment; the first connection segment is fixedly connected to the side wall; the plurality of air vents is provided on the second connection segment; the plat portion is bended from the second connection segment.

6. The speaker box as described in claim 5, wherein a first slot is formed by denting from a surface of the first connection segment facing the frame along a direction away from the frame; a first protrusion protruding towards the main magnet is provided on the side wall to match the first slot.

7. The speaker box as described in claim 6, wherein a second slot is formed by denting from a surface of the first connection segment away from the frame towards the frame; a second protrusion protruding away from the main magnet is provided on the side wall to match the second slot.

8. The speaker box as described in claim 6, wherein the magnet system further comprises a second magnet spaced apart from the main magnet to form the magnetic gap, and an annular second yoke disposed on a side of the second magnet away from the main yoke; the second yoke comprises a fixation protrusion protruding from an outer edge thereon towards the side wall; the fixation protrusion is abutted to a side of the first protrusion facing the second magnet.

9. The speaker box as described in claim 2, wherein the elastic support member further comprises a location bar connected with the bottom wall and spaced and parallel to the side wall; the main yoke comprises a side surface abutted against to the bottom wall; a location slot is formed on the main yoke by denting from the side surface along a direction away from the side wall; the location bar is fixedly connected to the main yoke by matching with the location slot.

10. The speaker box as described in claim 1, wherein the housing comprises a first cover and a second cover fixed to each other; an installation hole is provided on the second cover to install the speaker, thus exposing the metal mesh cover and the main yoke outside the installation hole.

* * * * *